United States Patent [19]

Funk

[11] 4,082,368

[45] Apr. 4, 1978

[54] METHOD AND APPARATUS FOR HYDRAULIC TRANSMISSION OF COAL, OIL SHALE, MINERAL ORES, ETC. FROM THE FACE TO THE SURFACE OF UNDERGROUND MINES

[75] Inventor: Erwin D. Funk, Glens Falls, N.Y.

[73] Assignee: Kamyr Inc., Glens Falls, N.Y.

[21] Appl. No.: 720,391

[22] Filed: Sep. 3, 1976

Related U.S. Application Data

[63] Continuation-in-part of Ser. No. 489,038, Jul. 16, 1974, Pat. No. 3,982,789.

[51] Int. Cl.² ........................ B65G 53/30; B65G 53/46
[52] U.S. Cl. ............................................. 302/14; 299/64
[58] Field of Search ..................... 302/14, 15; 299/18, 299/64

[56] References Cited

U.S. PATENT DOCUMENTS

| | | | |
|---|---|---|---|
| 2,914,223 | 11/1959 | Richter | 222/194 |
| 3,260,548 | 7/1966 | Reichl | 302/14 |
| 3,411,986 | 11/1968 | Buchberger et al. | 222/370 |
| 3,429,773 | 2/1969 | Richter | 162/237 |
| 3,449,013 | 6/1969 | Sakamoto et al. | 302/14 |
| 3,485,534 | 12/1969 | Wanzenberg et al. | 302/14 |
| 3,845,990 | 11/1974 | McCain | 302/15 |

FOREIGN PATENT DOCUMENTS

| | | | |
|---|---|---|---|
| 174,094 | 5/1959 | Sweden | 302/14 |
| 324,949 | 6/1970 | Sweden | 302/14 |

*Primary Examiner*—Bruce H. Stoner, Jr.
*Assistant Examiner*—Jeffrey V. Nase
*Attorney, Agent, or Firm*—Cushman, Darby & Cushman

[57] ABSTRACT

A method and apparatus for hydraulically transmitting coal, oil shale, mineral ores, etc. from the mine face to the surface of underground mines via a pipeline by injecting the mined material from near the mine face into a body of water flowing in a pipeline, such injection being accomplished by an injection device which moves the mined material into the pipeline without applying any pushing forces and relocates the mined material in a continuous fashion from a first low pressure water circulation loop into a second higher pressure water circulation loop. The second water circulation loop communicates as required with a second injection device which relocates the mined material to a third higher pressure water circulation loop for increasing the pressure in the pipeline for transmission from deep mines.

4 Claims, 8 Drawing Figures

METHOD AND APPARATUS FOR HYDRAULIC TRANSMISSION OF COAL, OIL SHALE, MINERAL ORES, ETC. FROM THE FACE TO THE SURFACE OF UNDERGROUND MINES

This application is a continuation-in-part of my co-pending application Ser. No. 489,038, filed July 16, 1974 which issued Sept. 28, 1976 as U.S. Pat. No. 3,982,789.

This invention relates to a method and apparatus for hydraulically transmitting coal, oil shale, mineral ores, etc. from the mine face to the surface of underground mines via a pipeline.

Generally the underground mining of materials such as coal, oil shale, or mineral ores involves machinery for freeing the material from the face of the seam. This machinery may or may not be continuous. After the material is freed from the seam, current practice is to load the material on to shuttle cars or belt conveyors for conveyance to the surface. In some cases a combination of shuttle cars and conveyors is used; whereby the shuttle cars provide mobility at the face moving the mined material a short distance to fixed belt conveyors. Recent innovations have produced flexible conveyors that provide some mobility near the face. These types of conveyors have taken the form of either rectractable/extending belts or belts mounted on serpent-like spines providing flexibility. Although these conveyor belts improve mining efficiency, improvement of mining safety has not been simultaneously achieved. Two major hazards continue to exist, namely, injury due to the moving parts and health or fire hazards due to dust accumulation in the mine. The conveyor belts produce dust while conveying material from the mine. Normally a distance in the range of 5 to 10 feet exists between the belt support rollers. The weighed down belt sags between the rollers and as the belt passes over the roller a rapid change of belt direction occurs, causing a slight bounce of the conveyed material at the roller. This slight bounce causes dust to be liberated at each roller. A totally enclosed hydraulic piping system would serve to eliminate these hazards. The advantages are no moving parts exist in the pipe and no dust would be liberated.

Several methods and apparatus have been pursued to provide for transport of mined materials via a pipeline. S. A. Jones, U.S. Pat. Nos. 2,672,371 and 2,672,370, uses a plurality of pipes with associated pump and switching valves. The pump provided the motive force for pushing coal out of one pipe while simultaneously sucking coal into an adjacent pipe. When one pipe was filled and the other emptied the procedure was reversed by the switching valves. The pipes for switching could be quite long, from 100 yards to a mile. The switching system required check valves which could become difficult to close on large particle slurries. This transfer system is more suitable for a fixed operation than for the mobility required at a mining face. Very precise control is required to prevent coal from entering the pump.

F. W. Wanzenberg, U.S. Pat. No. 3,485,534, uses a rotating drum containing two or more axially through-going chambers; the rotating drum having fixed end plates connected to a drum chamber filling circulation loop and drum chamber emptying circulation loop. The end plates contained seals against the rotating drum to prevent leakage to the surroundings. The drum device could be made more continuous by providing a plurality of chambers in the drum. Also the device could be used in stages to obtain greater pressures. A disadvantage of the invenion is the pressure encountered on the end plates and seals. The end plates must be forced tightly against the seals. Large axial thrust loads are then applied to the end plates. Additionally any leakage, that occurs at the seal, drains into the mine and most hazardly when a seal is blown. Another disadvantage is that each chamber fills and empties only once during each revolution of the drum.

R. L. Buchberger et al., U.S. Pat. No. 3,411,986, uses a device of similar but different characteristics of Wanzenberg, above. The constructional difference is that the rotating drum of Wanzenberg is a housing encased rotor with the chambers for filling and emptying coming in and out of the ends of the rotor periphery. The housing prevents leakage from entering the surroundings. This device is basically balanced and provides for filling and emptying twice each revolution. The device is for wood chip injection and does not lend itself to operation in the low head requirements of a mine seam because of its constructional form. The vertical shaft with a need for having pairs of two filling and emptying ports together would make this device too tall for most low head seams of 4 to 6 feed head room.

J. O. Richter, Swedish Pat. No. 324,949, is another device for injecting wood chips into a hydraulic piping system for digester processes. Additionally, co-pending U.S. application Ser. No. 489,038 of Funk is for the use of this device for pipelining of coal, oil shale, or ores. This injection device, because of its constructional form, also does not allow the necessary mobility in mines of low head seams. This device is more suited to fixed operation where large injection pressures are encountered which is the subject of co-pending application Ser. No. 489,038.

E. H. Reichl, U.S. Pat. No. 3,260,548, presents method and apparatus for continuously transporting mined coal from a continuously advancing mobile mining machine which uses a pump to suck in a mixture of coal and water and boosts the pressure for transport through the pipeline. A booster pump is installed further downstream for additional boost of pressure. This method and apparatus has the disadvantage of having to reduce the pressure of all transporting water to allow mixing of coal with the water prior to being introduced into the pump. Another disadvantage is the necessity of passing the coal particles through the pump. The pump will turn at sufficient speed to cause coal particle breakage and significant wear on the pump impellor. Centrifugal pumps generally have only the capability to gain pressures up to 200 feet of $H_2O$ (98 psig) when their impellors are not worn. For a 600 foot deep mine it would require three pumps in series just to overcome the mine hydraulic gradient and most likely one more pump to overcome pipe frictional losses if the seam face is over one-half mile from the shaft opening. Particle attrition becomes serious when this many pumps are involved.

The present invention contemplates a method and apparatus for continuous transporting of coal, oil shale, mineral ores, etc. from the mine face at substantially the same rate as that at which it is mined.

An objective of this invention is to provide method and apparatus with a constructional form and process configuration to allow mobility within underground mine seam.

Another objective is to provide a mobile apparatus for injecting the mined material into a pipeline flowing water at sufficient pressure to cause transport away from the mine face, said apparatus eliminating the necessity of passing large mined particles through the pump providing the pressure, said apparatus being capable of accepting mined particles from 4 to 6 inches in size.

Another objective is to provide a mobile injection device that fills twice per revolution of its rotor, does not expose its leakage to the mine, and acts as a shut-off valve when its rotor stops turning.

Another objective is to provide a method for substantially maintaining the pressure in the transporting pipeline while causing the relocation of the particles into the pipeline. This technique allows a significant reduction in energy consumption in comparison to a method where the pipeline pressure must be let down to allow particle introduction to a centrifugal pump suction port. When the pressure in the pipeline is let down, large energy consumption is required to raise the pressure; oftentimes requiring many pumps in series.

Another objective of this present invention is to provide a method whereby state of the art supporting equipment, such as pumps, valves, flexible pipe, and hard fixed pipe, may be used to accomplish the transporting. Flexible piping and centrifugal pumps now represent limitations to deep mining hydraulic transport. Use of flexible pipe is generally limited to 150 (350 feet $H_2O$) psig pressures. In most cases this pressure is only sufficient to overcome piping frictional losses to move the mined material to the locale of the mine shaft. Centrifugal pumps, when pumping large particle slurries, are generally only capable of creating pressures to 200 feet $H_2O$; however, when the large particle slurry is not present, centrifugal pumps can be obtained to pump slightly contaminated water to 2000 feet of $H_2O$ or more. For deep mines, the flexible pipe to allow movement of the mobile injection device will be a limiting factor. To allow for the hydraulic transport from deep mines this invention contemplates the use of a fixed booster device of similar form but different construction from the mobile injection device.

Another objective of this invention is to provide a fixed pressure booster device whereby the mined material does not pass through a centrifugal pump for pressure increase, said booster device being capable of causing pressure increases up to 2000 feet of $H_2O$, said pressure rise being created primarily by the depth of the mine shaft with a U-tube in the shaft and the relocation of the mined material into the U-tube by the booster device. A pump is located on the surface to provide the motive force to overcome frictional losses in the U-tube.

These and other objects of the present invention will become more apparent during the course of the following detailed description and appended claims.

The invention may best be understood with reference to the accompanying drawings, wherein an illustrative embodiment is shown.

Figure 1:
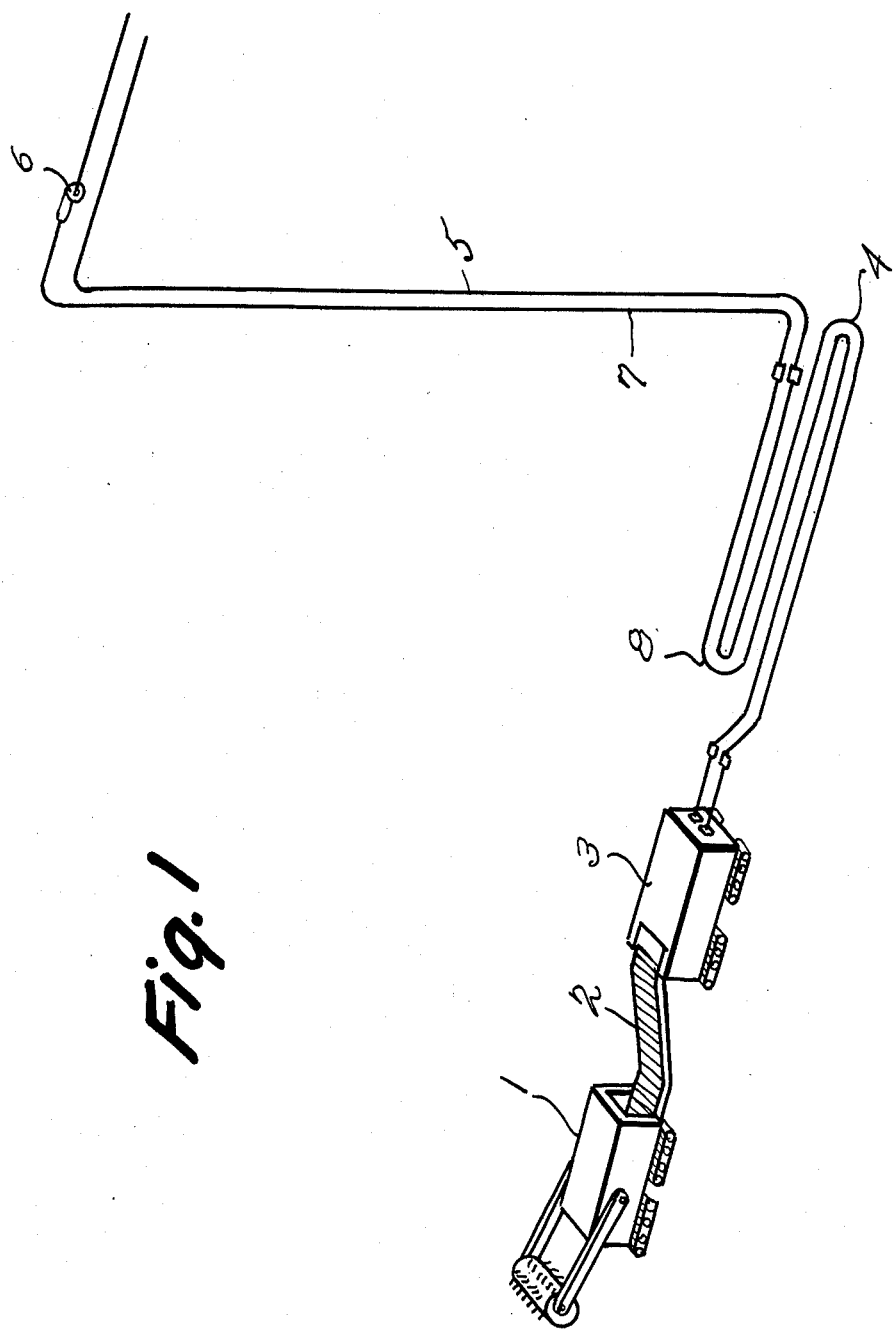
FIG. 1 is a schematic perspective view of a mining machine and mobile pipeline injection module system embodying the principles of the present invention.

Referring now more particularly to the drawings, the basic arrangement for hydraulically piping of mined material from the mine face is shown in FIG. 1. A continuous mining machine 1 removes the material from the face and moves the material by a conveyor 2 to the mobile pipeline injection module 3. The mining machine may be of any type for room and pillar mining or for planing in long wall mining. The conveyor may be a part of the mining machine or a part of the injection module. If the conveyor is to be linked between the mining machine and the injection module it must be of the flexible type. The conveyor can be a part of the injection module with no direct linkage to the mining machine. In this event the mining machine would discharge the mined material on to the mine floor to be scooped up by the conveyor. The injection module would in resemblance be like a conventional shuttle car with pipeline injection equipment in lieu of the storage hopper. Shuttle cars currently move to the mined material by scooping the material from floor by an integral conveyor/breaker. The breaker keeps the mined particles below a predetermined size. The shuttle car contains a hopper which collects the mined material. After loading, the shuttle car travels to a fixed conveyor to unload. The fixed conveyor then removes the mined material from the mine. After unloading, the shuttle car returns for reloading. In the present invention the mobile pipeline injection module remains behind the continuous mining machine for continuous acceptance of the mined material. The arrangement of FIG. 1 which is for illustrative purposes shows the conveyor linking the mining machine and mobile pipeline injection module. After injection of the mined material into the pipeline, the mined material is hydraulically conveyed by water through a flexible section of pipe 4 and then through fixed piping 5 to the mine surface for water separation. After water is separated from the mined material it is recirculated to the mobile pipeline injection module. This water recirculation is motivated by pump 6, located on the mine surface, which pumps water through fixed pipe 7 and flexible pipe 8 to the mobile pipeline injection module. As will be apparent during this description, the piping 4, 5, 7 and 8 and the injection device of module 3 comprise a closed U-tube in which the pressure due to mine depth is balanced between pipes 4, 5 and 7, 8. The pump 6 needs only to overcome piping frictional loss to cause a water flow in the pipes 4, 5, 7 and 8.

Figure 2:
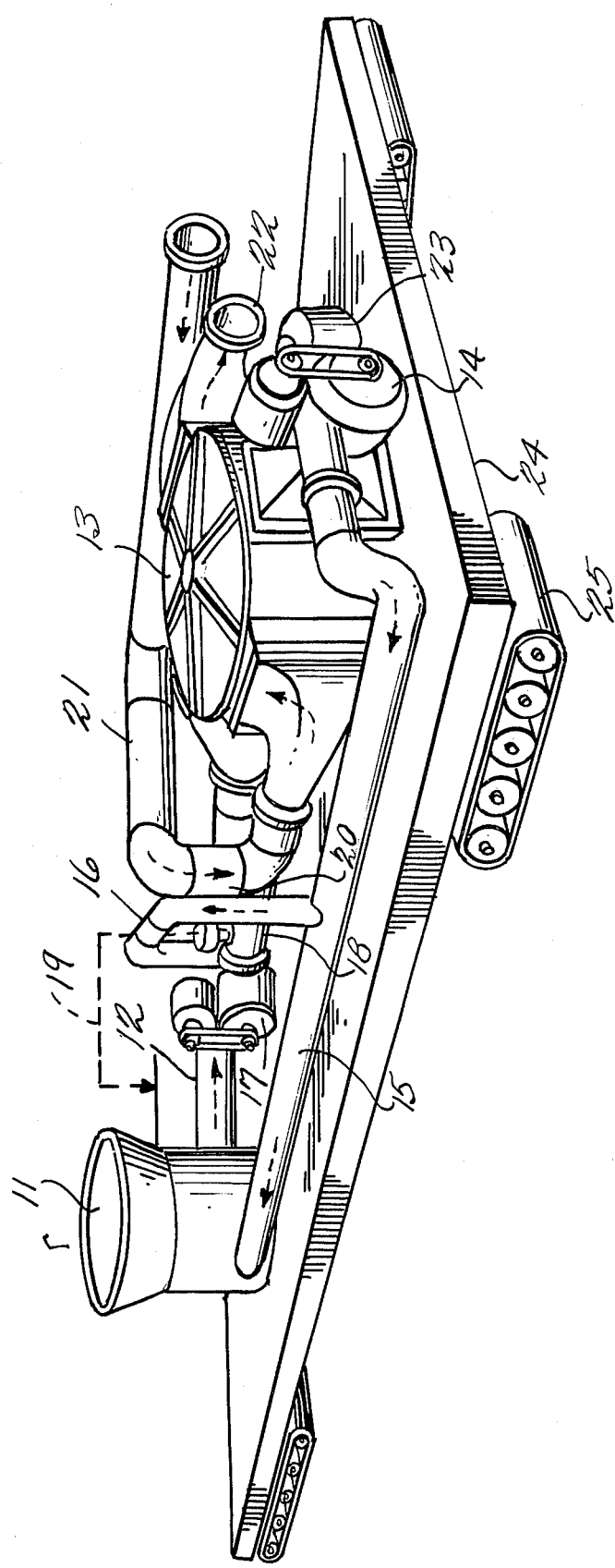
FIG. 2 is a perspective view of the mobile pipeline injection module.
Figure 3:
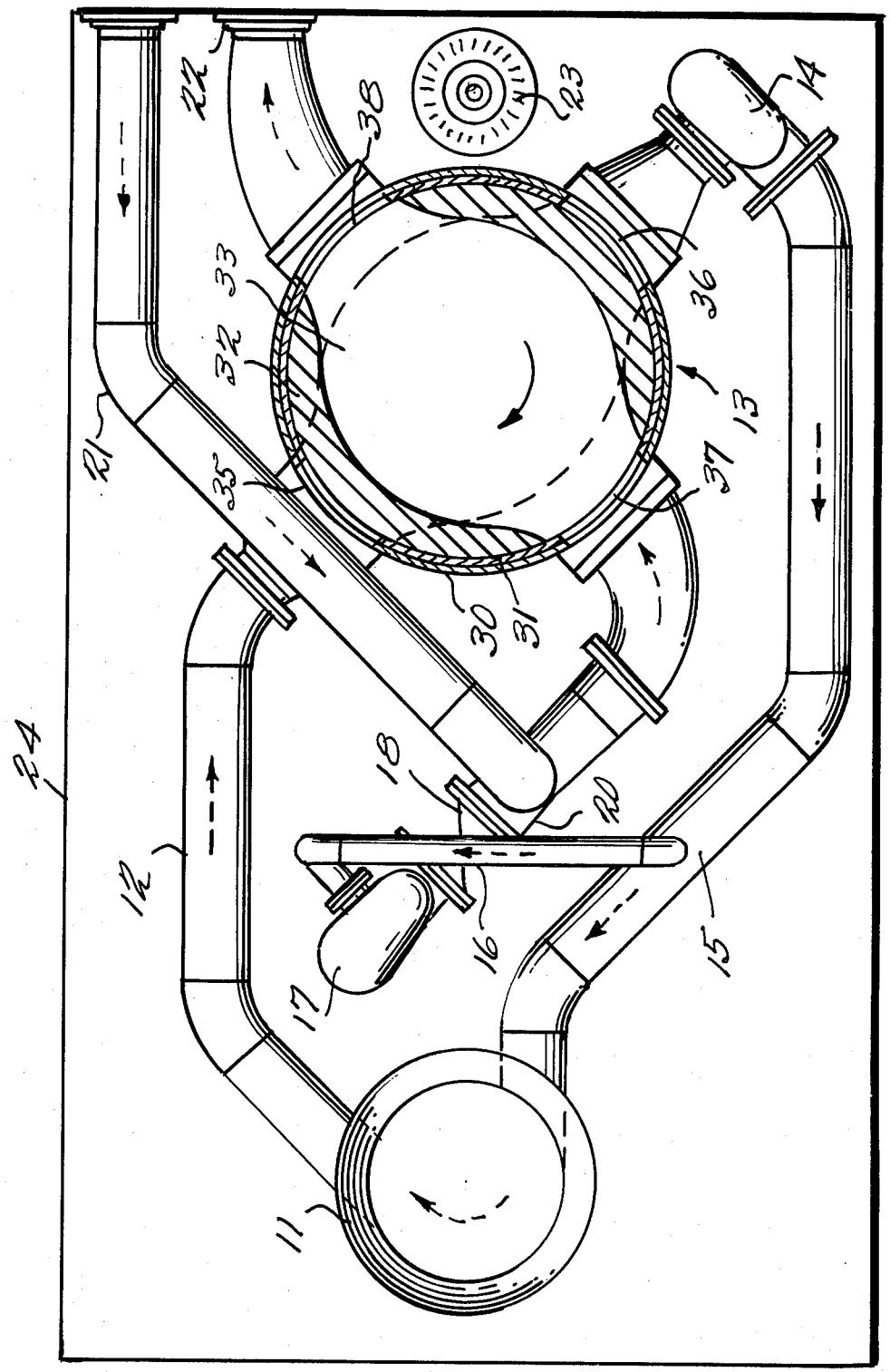
FIG. 3 is a top plan view of the mobile pipeline injection module shown in FIG. 2.

The mobile pipeline injection module contains a number of components to accomplish the injection; the main component being the injection device. FIG. 3 illustrates the components of the injection module without a feeding conveyor which may be a part of the mining machine. The principle of injection involves the relocation of mined material from a first low pressure water circulation loop into a second higher pressure circulation loop. The injection of mined material into the first circulation loop is accomplished at atmospheric pressure. The injection device 13 is common to both the low and high pressure circulation loops. The injection device contains a unique plurality of through-going holes which allow continuous flow of water in both the low and high pressure circulation loops during its operation. As illustrated in FIG. 2, the components comprising the low pressure circulation loop include a receiving and mixing tank 11; a pipe 12 connecting the mixing tank to the injection device 13; a low head centrifugal pump 14 which provides the water circulation and a pipe 15 which completes the low pressure circulation loop. The components comprising the high pressure circulation loop include the motivating pump 6 (as shown in FIG. 1 located on the surface); pipe 7 and flexible pipe 8 (also shown in FIG. 1); pipe 21 connecting to injection device 13; pipe 22; flexible pipe 4 and pipe 5 (shown in FIG. 1) to a water and solids separation facility.

The injection device will have some leakage from the high pressure circulation loop to the low pressure circulation loop. This leakage will attempt to cause a rise in the water level in the mixing tank 11. This rise in water level will be sensed by level control system 19 which modulates valve 18 to keep the level constant. The leakage is drawn from the low pressure circulation loop pipe 15 via pipe 16 and boosted in pressure by pump 17 to discharge through valve 18 and pipe 20 to the high pressure circulation loop pipe 21. The injection device is driven by motor 23. All components are mounted on base 24 which is motivated by tracks 25. The base and tracks are of any suitable type to provide mobility to the injection module components. The drive gears for the injection device 13 are mounted in or below the base 24.

Figure 4:
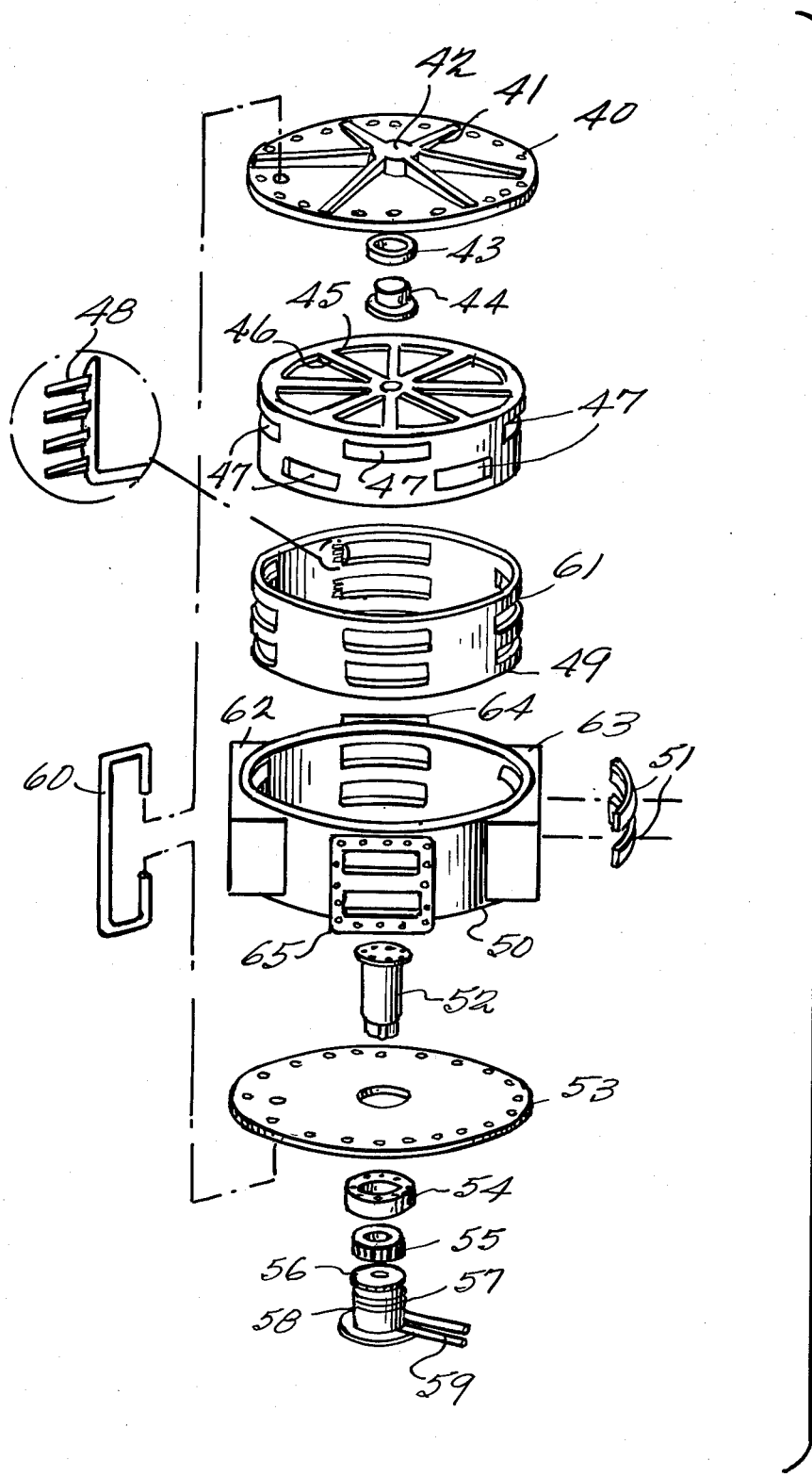
FIG. 4 is an exploded perspective view of the injection device of the module.

The principle of operation of the injection module components is more clearly apparent in the module plan view of FIG. 3 and injection device exploded view of FIG. 4. In the plan view of FIG. 3 a cross-section of the injection device 13 is shown. The section is taken through one rotor pocket 33. The rotor 32 is shown in a completely mated filling and emptying position within liner 31 and housing 30. Reference is made to commonly assigned co-pending U.S. patent application Ser. No. 489,038 where a transmission device is used to relocate mined material into a pipeline at a fixed location. An important aspect of the present invention is the construction embodied in the device 13 and the determination that a construction such as disclosed in the aforesaid application is not suitable.

The injection device 13 of this invention has several constructional form and functional differences from the transmission device of the co-pending patent application. As shown in FIG. 2, the injection device 13 has a low height achieved by the device rotor having a diameter greater than axial length. To increase the capacity of the injection device requires only the increase in rotor diameter without affecting the device height. To achieve the new constructional form the rotor shaft is vertical and the pocket openings of the rotor are rectangular with the longest dimension peripherally and the shortest dimension axially. The adjustment of the rotor position in the housing is performed hydraulically. A functional attribute of this invention is the ability of the injection device to act as the tight shutoff valve during a power failure. The rotor will drop tightly into the housing due to its own weight. The taper of the rotor will cause a wedging as in a plug valve when it drops lower into the housing.

In FIG. 3 the plan of injection module components does not represent the only location or arrangement, but is for illustrative and descriptive purposes. The mined material drops by gravity into mixing and receiving tank 11. A turbulence is created in the tank which causes mixing of the mined material and the water. Water mixed with the mined material is drawn through pipe 12 by centrifugal pump 14. Before being drawn into pump 14 the mined material is drawn into pocket 34 of injection device 13. A screen located in housing port 36 retains mined particles in the pocket 34 above the size of the screen opening but allows water to flow through to the pump 14, such water being pumped through pipe 15 back to tank 11 completing a circulation loop. A great majority of particles smaller than the screen opening will be retained in the pocket by virtue of larger particles causing a straining action. The pocketed rotor of the device 13 basically serves to substantially continuously remove from communication with the first loop or flow path successive volumes of mined particles larger than a predetermined size determined by the screen openings which are entrained in liquid, while permitting the liquid with mined particles smaller than the predetermined size to flow along the first flow path downstream. At the same time, corresponding successive volumes of liquid are transferred from the second loop or path to the first loop.

The physical occurrences in the pocket are that as rotor 32 is turning, as indicated in a clockwise rotation, a pocket begins to open to ports 35 and 36. Mined particles in low concentration with the water begin to enter the pocket; said pocket containing mostly water having previously been emptied; said water being drawn out of the pocket first to allow the low concentration mix of mined particles and water to enter. As the rotor 32 continues to turn, more open screen area is exposed causing more low concentration mix to be drawn into the pocket. When the screen begins to retain the mined particles, the particles come together increasing the mix concentration significantly. The water which was contained in the low concentration mix goes on through the screen. As the rotor continues to turn an adjacent pocket begins to fill; this becomes more apparent as the description continues. After the rotor pocket fills, the turning of the rotor brings a filled pocket 33 into communication with ports 37 and 38 of the high pressure water circulation loop. As the pocket first begins to open to these ports the mined particles begin to sluice out into pipe 22 and this sluicing out continues as pocket opening continues thus again lowering the concentration of mined particles to water. By the time the pocket 33 closes to ports 37 and 38 all mined particles have been sluiced out leaving only water. The water comes from the mine surface via pipe 21. The rotor 32 contains four such through-going pockets arranged in perpendicular pairs; one pair is shown in FIG. 3 by pockets 33. Each pair of pockets is located diametrically 45 degrees from the other pair. In FIG. 3 this second pair of pockets is not visible but is located in directions of the centerlines shown for the injection device 13. This configuration of pockets insures a constant cross-sectional opening into and out of the rotor for any rotor position for both the low pressure circulation loop and the high pressure circulation loop. Therefore the transmission device 13 is continuously filling and emptying of mined particles at all times. A lining 31 is fitted inside housing 30 for purposes of wear. Since a pressure differential exists between the high pressure circulation loop and the low pressure circulation loop, a leakage will occur between rotor 32 and liner 31 to the low pressure circulation loop. This leakage would cause a water level rise in mixing tank 11. The water level rise is prevented by pumping the leakage back into the high pressure circulation loop. The leakage is extracted from pipe 15 via pipe 16 by pump 17. Pump 17 discharge rate is controlled by mixing tank level control valve 18 to flow into pipe 21 for return to the high pressure circulation loop.

The constructional form of the injection device 13 is shown in FIG. 4. A description of the device parts will follow herewith. The major parts are the housing 50, liner 49, rotor 45, and end bells 40 and 53. The end bells 40 and 53 are bolted to the housing 50. Each end bell contains reinforcing ribs 41 to sustain the internal pressure of the injection device. End bell 40 contains a bearing and shaft housing 42 into which fits bearing 43 and shaft 44. Bearing 43 can be a roller bearing or a solid oil-less bearing; in either case it must be sealed or continually purged to prevent entry of small mined particles. Shafts 44 and 52 are bolted rigidly to the rotor 45. Rotor contains reinforcing ribs 46 on both the top and bottom ends. Additionally the rotor is tapered toward the lower end, said taper allows the rotor to be lowered in relative position to the housing to make up for wear. Liner 49 contains a corresponding taper to accept rotor 45. The pocket openings 47 can be clearly seen in this exploded view. As indicated the pocket width is constructed such as to provide a constant open area around the periphery of the rotor 45, said constant open area being the key to continuousness. Although not easily visualized in FIG. 4, but more so in FIG. 3, the pocket width increases and height decreases as it penetrates through the rotor. This pocket dimensional change is essential in allowing the openings of a pocket pair to be peripherally in line. The pocket penetrations must loop over each other to provide these inline openings. A rigid membrane exists between the two pockets to allow this looping over. The dimensional change in the pocket as it penetrates through the rotor also provides for maintaining a constant cross-sectional opening to water flow.

The liner 49 contains openings 61 to match the ports in housing 50. The lining also contains grooves 48 which dampen out pressure shocks when a pocket begins to open to the housing high pressure ports 64 and 65. The grooves slowly allow water to enter the pocket during the transition from low to high pressure. Housing 50 contains four ports 62, 63, 64, and 65, all located 90 degrees from each other around the housing. The ports 62 and 63 are the ports associated with the low pressure water circulation loops and ports 64 and 65 with the high pressure water circulation loop. A connector piece is normally bolted to each port for making a transition to a round pipe (not shown in FIG. 4). Port 63 has screens 51 mounted in it to retain the mined particles in the pocket of the rotor 45 when the pocket is in communication with the low pressure circulation loop.

Shaft 52 passes through a packing box 54 which is rigidly mounted to end bell 53. This packing box prevents leakage between the rotating shaft and fixed end bell 53. Attached to shaft 52 is a spline gear 55, or as an alternate a belt sheave, said spline gear providing a driving means. The lower end of the shaft is mounted to a thrust and radial bearing mechanism 56, said bearing mechanism being supported by a piston mechanism comprising a support plate 57, cylinder with piston 58, and hydraulic control lines 59. The hydraulic mechanism is used to position the rotor in the housing and to vent on power failure to allow the rotor to drop tightly into the housing to act as a plug valve. An end bell pressure equalizing line 60 provides for balanced end bell pressures. As previously described, if the mine is deep or the pipeline from the mobile pipeline injection module to the surface is long, generally over one mile, it will be necessary to boost the pipeline pressure in order to provide sufficient head pressure. A limitation of approximately 100 to 150 psig is placed on the injection device primarily because flexible pipes will become not so flexible above this pressure. If the pipes are constructed to be more flexible above this pressure they would become more heavy and difficult to move around. This invention also provides a method for utilizing the mobile pipeline injection module with the transmission device of co-pending patent application Ser. No. 489,038 for boosting of pipeline pressure for pipelining of mined material for longer distance and from greater mine depths.

Figure 5:
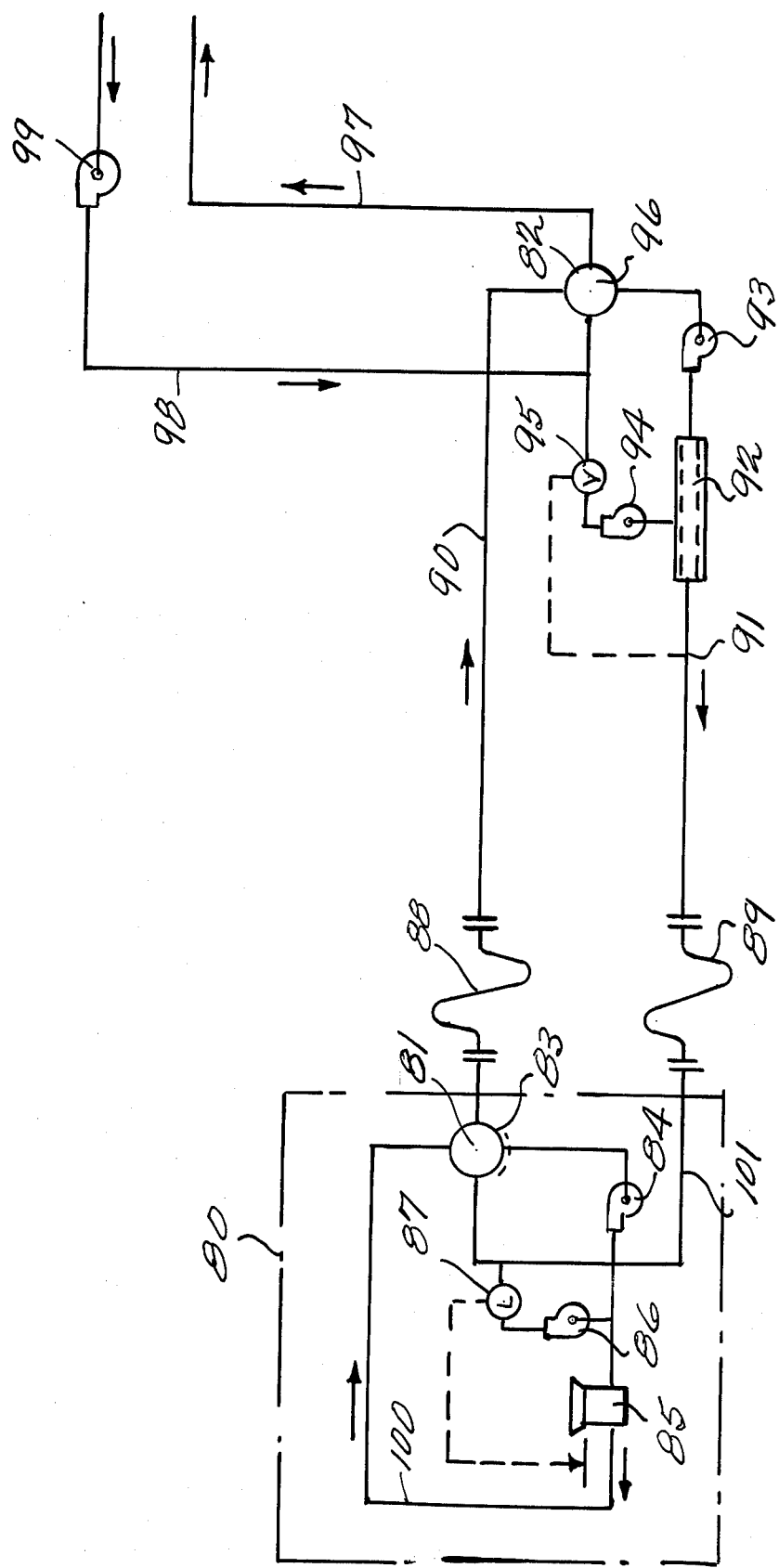
FIG. 5 is a schematic diagram of the mobile injection module and pressure booster station.

The method for continuous hydraulic transport of mine material from the mine face to the mine surface for deep mines is schematically represented in FIG. 5. The method involves three water circulation loops; loop 1, loop 2 and loop 3. The injection device 81 is common to loops 1 and 2 and the transmission device which will now be named booster device 82 is common to loops 2 and 3. In principle the mined material is introduced into loop 1 at atmospheric pressure and transferred to loop 2 by injection device 81. From loop 2, the mined material is transferred to loop 3 by booster device 82. The mined material is discharged from loop 3, at the mine surface at atmospheric pressure, to a cleaning plant or some type of facility for separating the mined material from the water. The water is recycled in loop 3 by pump 99. In FIG. 5 the injection module is indicated by being enclosed by a dashed and dotted line 80. In sequence the mined material is introduced into mixing tank 85 and sluiced through pipe 100 and into injection device 81 to be stopped by screen 83 while water is pumped by pump 84 back through the mixing tank 85 to continue entraining new mined material. The mined material captured in the injection device, rotor pocket is forced by water to flow into flexible pipe 88 when the rotor comes into communication with loop 2. The mined material is then hydraulically transported via pipe 90 and into booster device 82 to be stopped by screen 96. The water continues on through screen 96 to pump 93 to be raised in pressure to cause water circulation in loop 2. From pump 93 the water passes through inline drainer 92, pipe 91, flexible pipe 89 and pipe 101 back to injection device 81 to complete loop 2. The mined material captured in the booster device, rotor pocket is forced by water to flow into pipe 97 when the booster device rotor comes into communication with loop 3. The mined material is then hydraulically transported via pipe 90 to a separation facility to retrieve the water. The retrieved water is recycled to booster device 82 by pump 99 via pipe 98.

The water pressure progressively increases from loop 1 to loop 2 to loop 3. The largest pressure increase is generally between loop 2 and loop 3, since the booster device 82 can sustain a larger pressure increase because of constructional form. Both the injection device 81 and booster device 82 will experience leakage past their rotor as previously described for the injection device 81. Leakage past the rotor of the injection device will tend to result in a water level rise in the mixing tank 85. This level rise is prevented by pump 86 in conjunction with valve 87 to return the leakage to loop 2. Additionally the mined material displaces water when entering the injection device pocket, said displacement would result in a water level rise in mixing tank 85; however, said displacement is returned to loop 2 the same as with the leakage.

The leakage and displacement from booster device 82 would result in a continuously rising pressure in loop 2, said continuously rising pressure is prevented by controlling the pressure in loop 2 by returning booster device leakage and displacement to loop 3. The leakage and displacement is returned to loop 3 by pump 94 which extracts from inline drainer 92 located in loop 2. Pump 93 extraction rate from loop 2 is controlled by pressure sensing valve 95. The inline drainer is basically a cylindrical housing containing an internal parallel cylindrical screen. The water of loop 2 flows straight through the cylindrical screen at sufficient velocity to keep the screen openings wiped clean. The booster device leakage and displacement is drawn from the annular space between the screen and housing. The inline drainer's general purpose is to provide a clarified water to pump 94. Pump 94 must receive water free of large particles, greater than one millimeter, in order to be capable of obtaining the pressure rise necessary to return water to loop 3. A cyclone can be used in lieu of the inline drainer 92.

Figure 6:
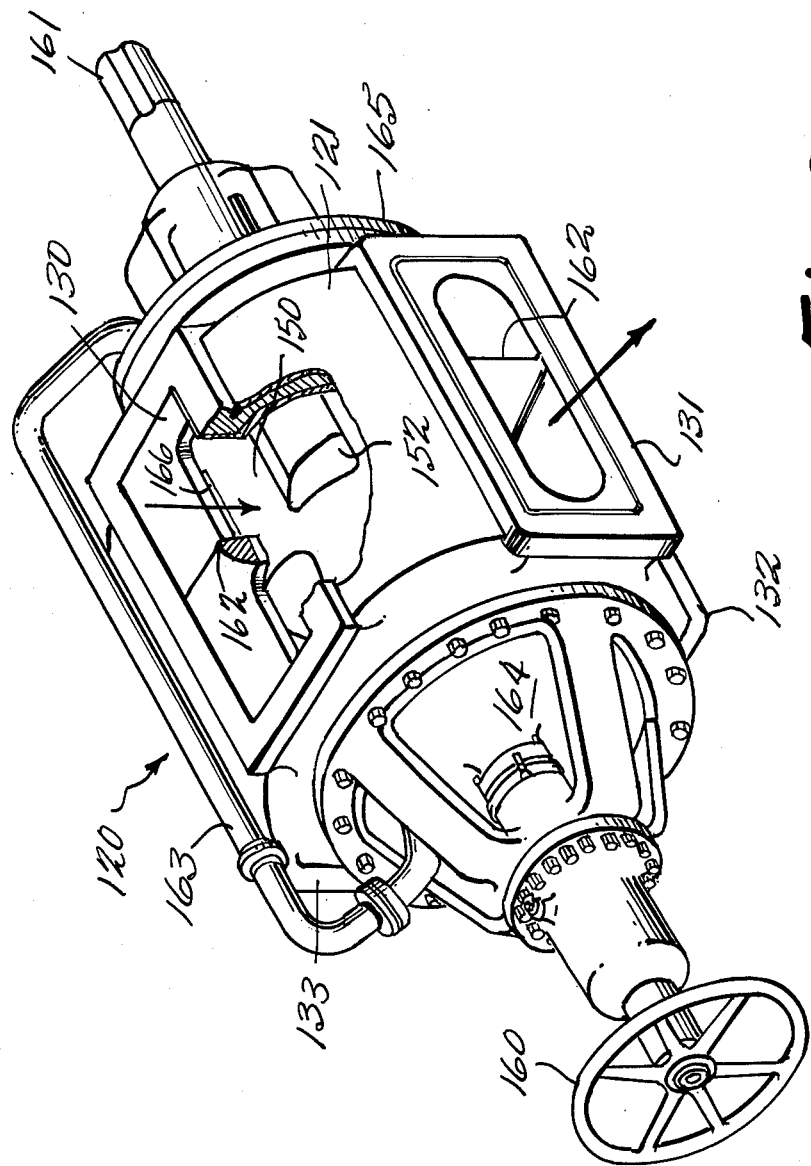
FIG. 6 is a perspective view of the booster device used in the booster station.
Figure 7:
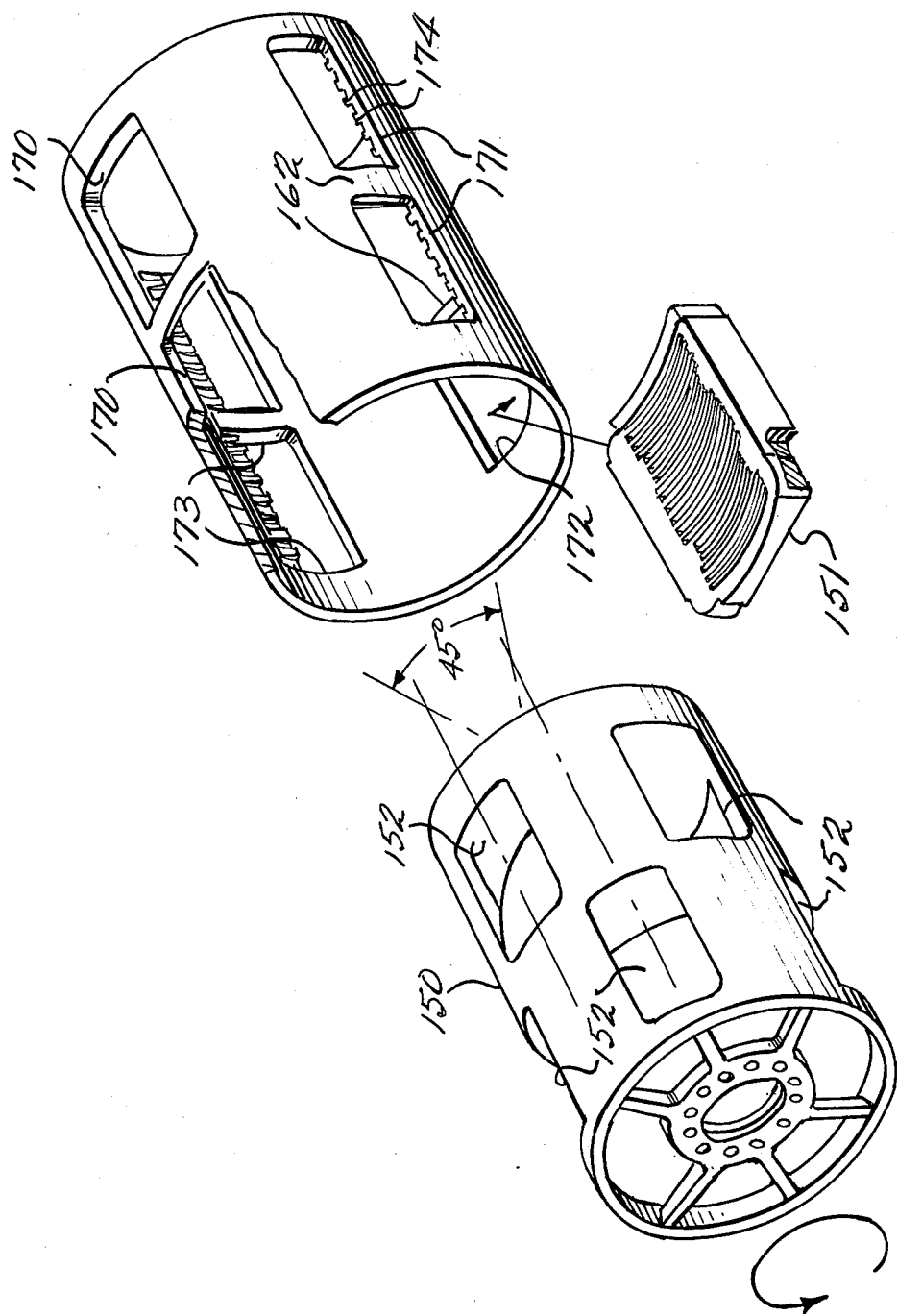
FIG. 7 is an exploded perspective view of the booster device liner and rotor.

The booster device is shown in FIG. 6 in perspective and its rotor, liner and screens are shown in exploded view in FIG. 7. The booster device includes a pocketed rotor 150 containing two rows of diametrically through-going pockets 152, each row containing two through-going pockets perpendicular to each other presenting four open ports equally spaced around the periphery of the rotor for each row. The two rows of pockets are parallel, one row being 45° displaced peripherally from its adjacent row as is shown in FIG. 7. The pocketed rotor 150 is encased by housing 121 and mounted for rotation within a housing liner 166. As best shown in FIG. 7 the liner 166 includes four ports, 170, 171, 172 and 173 equally spaced around the periphery of the housing which register respectively with inlet 130, outlet 131, outlet 132 and inlet 133. Each port is more than twice as wide as the sum of two pockets in the pocketed rotor and a divider 162 is located midway in each housing port to separate the same into two parallel ports, as clearly depicted in FIGS. 6 and 7.

The pocketed rotor 150 may be either cylindrical or tapered; illustration of such being shown in FIGS. 6 and 7 as tapered with rotor diameter increasing in the direction of a clearance adjusting hand wheel 160. Tapering of the rotor 150 provides for adjustment of the clearance between the rotor 150 and housing liner 166; additionally, increase in clearance due to wear can be taken up by turning hand wheel 160 pushing rotor 150 toward a shaft drive end 161 shown in FIG. 6. The pockets 152 through rotor 150, in a row, loop over each other so as to provide passage through the rotor while maintaining inline openings in the rotor, around the periphery of the rotor. While looping the pocket becomes narrower but wider, the narrowing being necessary to accomplish the looping over the passages and the widening being provided to maintain a nearly constant pocket cross-sectional area for liquid and coal particle flow.

Coal particles entering the booster device 120 with liquid through inlet 130 are drawn by gravity and liquid motion provided by pump 93 through ports 170 and 172. A screen 151 is disposed within each port 172 so that water passes through each screen 151 but particles of the predetermined size range larger than the screen opening are thus held in the communicating rotor pocket 152. As the filled pocket 152 rotates and begins to approach a position nearly perpendicular to its filling position, water is forced through port 173 into the pocket causing discharging of coal particles from the pocket through port 171. Before the pocket again rotates to the filling position all coal particles are emptied from the pocket leaving only water in the pocket. The pocketed rotor 150 rotation is continuous but the filling and emptying of pockets in a single row of pockets is intermittent. Since the adjacent parallel row of pockets is displaced 45 degrees peripherally, intermittent filling and discharging rows of pockets is continuous. The continuous operation is in effect of the peripheral displacement of the two parallel rows of pockets, such displacement being shown in FIG. 7, for as the pocket is closing to a housing inlet port a pocket is opening to the same port thus always maintaining a constant open cross-section through the filling ports 170 and 172 and the discharging ports 171 and 173 making the filling and discharging systems continuous.

The booster device 120 is uniquely characterized by several important internal features. The first of these is the ability to transfer coal particles from one flow path to another flow path at higher pressure without the need for positive sealing surfaces. According to the present invention the rotating pocketed rotor 150 need not come into intimate contact with the housing liner 166 but may present a clearance therewith. Since ports 170 and 172 are at a lower pressure than ports 171 and 173 a leakage occurs in the form of water flow from ports 171 and 173 to ports 170 and 172 through the clearance. The water flow through the clearance is maintained small by maintaining the clearance narrow. The small water flow provides a lubrication and cleaning function which prevents binding of rotor 150 with housing liner 166. Secondly another unique feature of the booster device 120 is the retaining of coal by screen 151 while allowing a liquid drawing action. During filling of pocket 152 in the rotor 150, water is drawn through the peripheral slots in screen 151. The constructional form of the booster device 120 is such that self-cleaning of the screen 151 is provided, such cleaning being performed by the edge of the rotor pocket as the edge passes over the slots. Thirdly, the liner 166 may be provided with one or more grooves 174 adjacent the port openings 171 and 173, as shown in FIG. 7. The grooves 174 are formed with a peripheral dimension which is greater than the dimension measured in the radial direction, so that a water flow at high pressure into the pocket openings 171 and 173 is exposed to strong choking action. Consequently, shocks and vibrations originating on pocket-to-port opening are milder, reducing the tendency of coal particles to break.

A housing equalizing line 163 is provided communicating the housing end bells 164 and 165 for the purpose of equalizing the pressure in the housing end bells to prevent end thrust upon bearings. A specific advantage of the booster device is that the pressure at ports 171 and 173 is nearly equal and the pressure at ports 170 and 172 is nearly equal, producing nearly no side thrusts on rotor 79 and associated bearings. As now apparent, the injection device and booster device are of similar physical principles of operation but of different constructional forms, said injection device being capable of fitting into seams of low head room, 4 to 6 feet, for a low pressure hydraulic transport and said booster device of fixed hydraulic transport capability for imparting high pressure hydraulic transport. The capabilities of said device will be examined.

The injection device as previously described is somewhat limited to pressure capability, not by the device, but by the flexible pipes which connect the device to the fixed piping. The rate of mine particle transfer by the injection device is dependent upon the volume of the rotor pockets times two because the pockets fill twice for each revolution. A conventional mining machine for a material such as coal can mine at rates of approximately 15 tons per minute, or with coal bulk density of 50 lbs./cu. ft. at 600 cubit feet per minute. This means that the mobile injection device must have this volume transfer capability. For a seam of 48 inches height, the injection device rotor height should be approximately 2 feet; the remaining 2 feet to be used for the end bells, wear adjustment and drive gears. A rotor at 3 to 1 diameter to height ratio would then have a rotor diameter of 6 feet. The total volume of the rotor envelope is then approximately 55 cubic feet. Of this 55 cubic feet approximately 60% will be open pocket volume and the remaining 40% will be steel comprising the rotor. The total pocket volume of the rotor is then 33 cubit feet (55 × 0.60). The transfer rate is then 66 cubit feet per rotor revolution since the pockets will fill twice on each revolution. Generally the rotor speed is 7 to 10 RPM. At 10 RPM the rotor transfer rate is 660 cubic feet or slightly more than the mining machine. A mining machine rated at 15 tons per minute generally cannot maintain this rate on a daily basis since the machine will normally cut a corridor through the seam wider than the mining machine. Therefore the mining machine consumes time in repositioning and cleanup when cutting is not taking place. The average coal rate could be more like 10 to 12 tons per minute; or an approximate average of 75% pocket filling of the injection device rotor when turning at 10 RPM. For such a rotor size as just described a pocket opening dimension on the rotor periphery would be approximately 8 inches × 28 inches. The mined particles must then be smaller than 4 inches to insure that jamming does not occur at the pocket opening. For mines with seams higher than 4 feet, the rotor height can be increased which in turn increases the particle size that can be injected. In a 6 foot high seam the rotor height can be increased with a corresponding reduction in rotor diameter of a diameter to height ratio of 1.5 to 1. This would present a rotor with a height of 3 feet and a diameter of 4.5 feet to inject at a rate of 10 to 12 tons per minute. This rotor size change gives a pocket opening dimension of approximately 14 inches by 21 inches which means a particle size of up to 7 inches can be injected. When particle sizes get larger, the power consumption of the transporting system increases because greater pipeline water velocities are needed to move the particles. If the mining machine output contains particles greater than 4 inches a crusher can be installed on the mining machine or on the injection module to control the size. A pipeline water velocity in the range of 12 to 14 feet per second is required to move the coal at slurry concentrations up to 35% by volume.

The booster device sizing is not critical, since it is to be of fixed location where the earth can be hollowed out to accept its constructional form. Generally the booster device rotor will have a diameter of about half the rotor length, with the shaft horizontal, said small diameter being better for high pressures.

Figure 8:
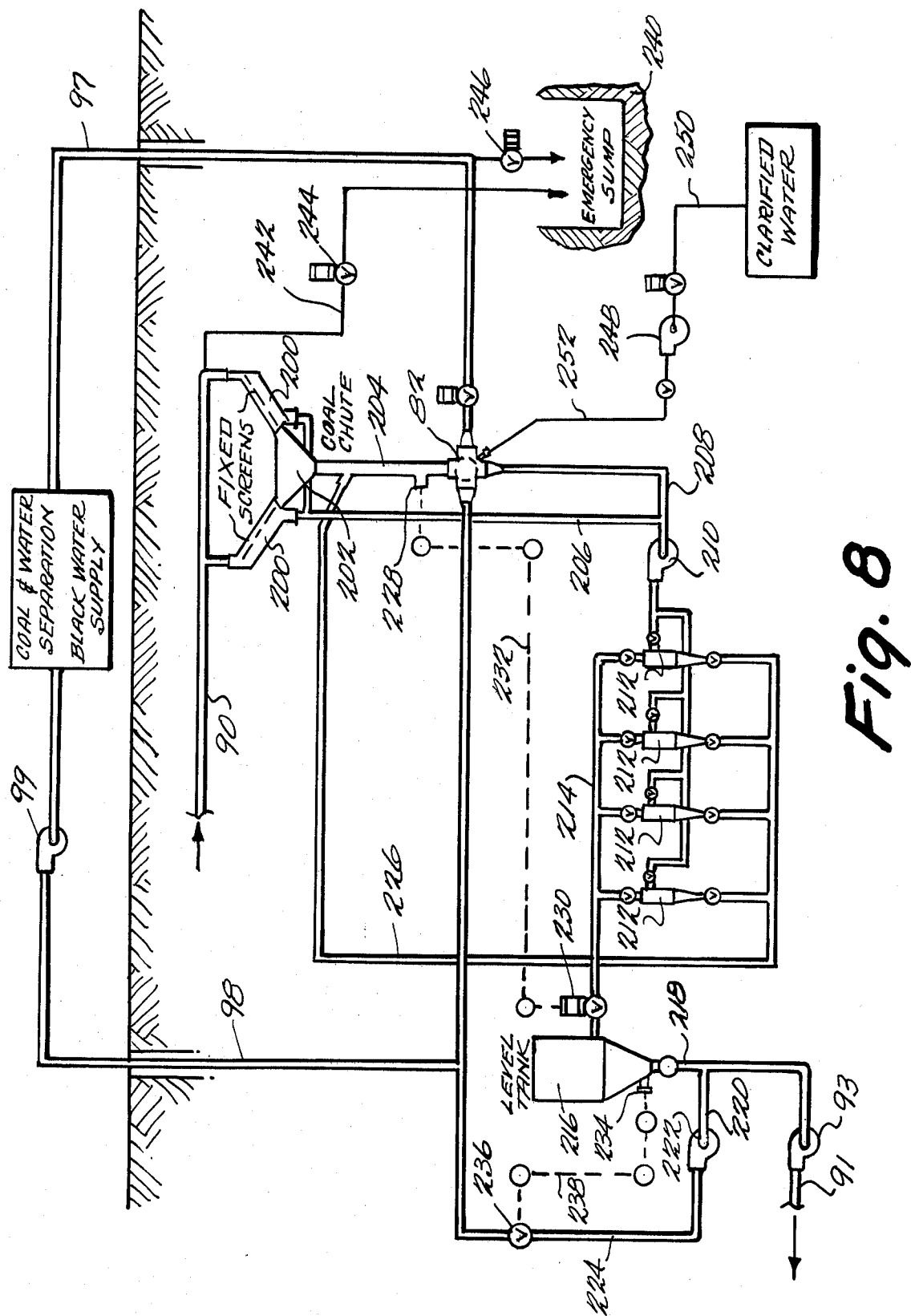
FIG. 8 is a schematic diagram of a preferred form of a booster station connection.

Reference is now made to FIG. 8 wherein there is disclosed a preferred circuit for effecting conveyance of the mine material from a position within the mine (e.g. at or adjacent the shaft) to a remote position outwardly of the mine (e.g. a separation plant). It will be apparent that this preferred arrangement will have applicability in any situation where conveyance of mine material or similar material is desired. While the circuit is admirably suited for conveyance upwardly from a deep mine, it will be apparent that it is equally applicable for surface-to-surface conveyance as well, particularly in strip and auger mining situations. In the arrangement shown in FIG. 8, the coal entrained in liquid flowing within the conduit 90, which constitutes a source pipe as far as the circuit of FIG. 8 is concerned, is directed to a pair of fixed screens 200. The overflow liquid entrained coal fraction coming from the screens, which contains most of the coal except for the fines, a collected in a trough 202 and directed to the upper end of a coal chute 204 which leads to the transmission device 82. It will be understood that the coal chute, which is in the form of a cylindrical member disposed with its axis upright, has its lower end connected and communicated with the low pressure inlet of the transmission device 82.

The underflow fines fraction coming from the fixed screens 200 is separately collected within an outlet flowpipe 206. The outlet flowpipe 206 communicates with a flowpipe 208 leading from the low pressure outlet of the transmission device 82. Pipes 206 and 208 lead commonly to the inlet of a chute circulation pump 210, the outlet of which is directed to a plurality of hydrocyclones 212. As shown, there are four hydrocyclones 212, three of which are adapted to be used in operation at all times, while the fourth constitutes a standby in the event that any one of the three operative cyclones needs repair or the like. It will be understood that manual valves are provided for the purpose of selectively operating which of the three hydrocyclones will be operative. The clarified liquid fractions coming from the overflow ends of the three operative hydrocyclones are directed, as by conduit 214, to a level tank 216. A valve controlled conduit 218 leads from the bottom of the level tank and extends to the inlet side of the pump 93 feeding to the return line 91.

In addition, a branch conduit 220 extends from the conduit 218 to the inlet of a make-up water pump 222. This make-up water pump feeds to the main high pressure inlet pipe through a conduit 224. Consequently, the make-up water pump 222 must be capable of increasing the pressure of the clarified water coming from the level tank 216 from a low pressure (virtually atmospheric) to full high line pressure. The three operative cyclones 212 are provided primarily for the purpose of protecting this pump against the abrasive effects of small coal particles. In this regard, it will be noted that the fine particle fraction coming from the lower apex of the operative hydrocyclones 212 are recirculated to the coal chute 204 as by a suitable conduit 226. The coal chute 204 thus receives liquid from essentially three sources: first, the funnel member 202 which receives the overflow of the fixed screens 200; second, the recirculated fine fraction coming from the hydrocyclones 212; and third, the leakage from the high pressure lines 98 and 97.

In order to insure that there will be adequate liquid within the coal chute 204 at all times, there is provided a level sensing sytem which includes a level sensing mechanism 228, a control valve 230 which is mounted in line 214 and a control circuit 232 therebetween. The liquid level within the tank 216 is maintained within suitable levels by a similar system which includes a level sensing mechanism 234, control valve 236 and a control circuit 238 therebetween. It will be noted that this arrangement serves to cut off flow of liquid to the high pressure system.

For purposes of by-passing the system in the event of a malfunction, there is provided within an approximate location of the transmission device 82 an emergency sump 240. The inlet line 90 is connected to the emergency sump by means of a conduit 242 controlled by valve 244. In a like fashion, a drain valve 246 is provided in the out-put high pressure line 97. It should be noted that this out-put line does not tend to plug if the energy drops because the device 82 is self-compensating in that, as the pressure goes down, less material is sluiced into the out-put pipe. This compensating effect will take place until a point is reached that virtually no new coal is sluiced into the out-put pipe. Consequently, the danger of plugging is materially reduced, if not entirely eliminated, and in many instances the emergency sump 240 may be dispensed with entirely. Likewise, where this is the case, it is not necessary to provide for a feeder purge pump such as the pump 248 having its suction side connected with a conduit 250 leading from a source of clarified water and its outlet connected to the housing of the transmission device 82 as by the conduit 252.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principes. Therefore, this invention includes all modifications encompassed within the spirit and scope of the following claims.

What is claimed is:

1. A process of continuously conveying mined material, such as coal or the like, from a mine site to a remote location, such as a point of utilization, said process comprising the steps of:
 progressively moving a supply of mined particles from the position at which they are mined at the mine site to a supply position at the mine site,
 confining a liquid within a first path including a volume defining a free surface disposed at said supply position,
 progressively introducing mined particles from said supply at said supply position into the liquid within said first confined path downwardly through the free surface thereof,
 maintaining a continuous flow of liquid and entrained particles from said volume into an incremental volume removal position within said first path,
 confining liquid within a second path which extends from said supply position to said remote location,
 continuously maintaining a flow of liquid within said second path in a direction from said supply position to said remote location by pumping the same at a pumping position,
 removing successive incremental volumes of liquid and entrained particles within said first path adjacent said supply position by blocking the flow of particles above a predetermined small size at said incremental volume removal position while permitting liquid and particles less than said predetermined size to flow within said first path beyond said incremental volume removal position and communicating said succcessive removed volumes of liquid and entrained particles with the liquid flowing in said second path at a position adjacent said supply position downstream of said pumping position, and
 removing a corresponding incremental volume of liquid from said second path adajacent said supply position at a position between said pumping position and said remote location for each successive incremental volume of liquid and entrained particles removed from said first path and communicating said corresponding removed incremental volumes of liquid with the liquid in said first path adjacent said supply position so that a substantially equal volumetric exchange between said paths takes place resulting in a net flow of mined particles from said first path to said second path and a substantially equal net flow of liquid from said second path to said first path.

2. Apparatus for conveying mined material, such as coal or the like, from a mine site comprising:
 a generally horizontally extending frame structure,
 means supporting said frame structure for movement along a generally horizontally extending surface, such as a mine floor,
 a water containing vessel carried by said frame structure, said vessel having an open top enabling a supply of mined material to be moved into said vessel downwardly through a free liquid surface of a body of liquid contained therein,
 a sluicing device carried by said frame structure including housing means having first path inlet means, first path outlet means, second path inlet means and second path outlet means formed therein, a wheel mounted in said housing means for rotational movement about a vertical axis and having a plurality of separate pockets extending horizontally therethrough for alternately communicating between said first path inlet means and outlet means and said second path inlet means and outlet means during rotation thereof within said housing and screen means in said first path outlet means,
 first horizontally extending conduit means between said vessel and said first path inlet means,
 second horizontally extending conduit means between said first path outlet means and said vessel,
 first pump means in said second conduit means operable to draw liquid from said first path outlet means passing through said screen means and establish a flow of liquid and entrained mined material from said vessel through said first conduit means to said first path inlet means,
 third conduit means leading to said second path inlet means,
 fourth conduit means leading from said second path outlet means,
 second pump means carried by said frame structure,
 fifth conduit means leading from said second conduit means at a position downstream of said first pump means to said second pump means, and
 sixth conduit means leading from said second pump means to said third conduit means.

3. Apparatus as defined in claim 2 including valve means in said sixth conduit means.

4. Apparatus for continuously conveying mined material, such as coal or the like, from a mine site to a remote location, such as a point of utilization, said apparatus comprising:

means for progressively moving a supply of mined particles from the position at which they are mined at the mine site to a supply position at the mine site, means for confining a liquid within a first path including a volume difining a free surface disposed at said supply position, means for maintaining a continuous flow of liquid and entrained particles from said volume into an incremental vlume removal position within said first path, means for progressively introducing mined particles from said supply at said supply position into the liquid within said first confined path downwardly through the free surface thereof, means for confining liquid within a second path which extends from said supply position to said remote location, means for continuously maintaining a flow of liquid within said second path in a direction from said supply position to said remote location by pumping the same at a pumping position, and means for (1) removing successive incremental volumes of liquid and entrained particles within said first path adjacent said supply position by blocking the flow of particles above a predetermined small size at said incremental volume removal position while permitting liquid and particles less than said predetermined size to flow within said first path beyond said incremental volume removal position and communicating said successive removed volumes of liquid and entrained particles with the liquid flowing in said second path at a position adjacent said supply position downstream of said pumping position, and (2) removing a corresponding incremental volume of liquid from said second path adjacent said supply position at a position between said pumping position and said remote location for each successive incremental volume of liquid and entrained particles removed from said first path and communicating said corresponding removed incremental volumes of liquid with the liquid in said first path adjacent said supply position so that a substantially equal volumetric exchange between said paths takes place resulting in a net flow of mined particles from said first path to said second path and a substantially equal net flow of liquid from said second path to said first path.

* * * * *